United States Patent [19]

Hagenlocher et al.

[11] 4,288,712
[45] Sep. 8, 1981

[54] ALTERNATOR STRUCTURE FOR ASSEMBLY WITH A MOBILE INTERNAL COMBUSTION ENGINE, PARTICULARLY FOR AUTOMOTIVE USE

[75] Inventors: Walter Hagenlocher, Stuttgart; Heinz Hesse, Gerlingen; Karl Kleebaur, Allmersbach; Christoph Kugel; Rüdiger Sohnle, both of Stuttgart, all of Fed. Rep. of Germany

[73] Assignee: Robert Bosch GmbH, Stuttgart, Fed. Rep. of Germany

[21] Appl. No.: 85,115

[22] Filed: Oct. 15, 1979

[30] Foreign Application Priority Data

Oct. 20, 1978 [DE] Fed. Rep. of Germany ....... 2845667

[51] Int. Cl.³ .............................................. H02K 5/00
[52] U.S. Cl. ..................................... 310/91; 310/89; 310/680
[58] Field of Search ............................. 310/85, 89–91, 310/254, 258, 216, 257

[56] References Cited

U.S. PATENT DOCUMENTS

| | | | |
|---|---|---|---|
| 1,411,442 | 4/1922 | Leece | 310/89 |
| 2,711,491 | 6/1955 | Edmundson et al. | 310/89 X |
| 3,021,442 | 2/1962 | Rodak | 310/89 X |
| 3,271,601 | 9/1966 | Raver | 310/68 R |

Primary Examiner—Mark O. Budd
Attorney, Agent, or Firm—Frishauf, Holtz, Goodman & Woodward

[57] ABSTRACT

To permit random selected positioning of an attachment arm (32) formed on the shell of an alternator with respect to a locating arm (33) thereon to tighten a drive belt driving the alternator from the engine, the locating arm (33) is integral with an end cover shield (12) attached to the shell (11). Preferably, the shell (11) is of hexagonal cross section, the shield (12) is likewise a hexagonal cross section, with attachment screws and screw openings in the corners of the hexagon to permit selected angular positioning of the locating arm and the attachment arm with respect to each other and match the configuration of the arms to different types of engines with which the alternator is to be used.

9 Claims, 3 Drawing Figures

ALTERNATOR STRUCTURE FOR ASSEMBLY WITH A MOBILE INTERNAL COMBUSTION ENGINE, PARTICULARLY FOR AUTOMOTIVE USE

Cross reference to related application, assigned to the assignee of the present invention: U.S. Ser. No. 085,116 filed Oct. 15, 1979, by the inventors hereof.

The present invention relates to an alternator structure which is particularly adapted to assemble the alternator with a mobile internal combustion engine, particularly an automotive-type internal combustion engine, in which the internal combustion engine provides the driving power to the alternator by means of a V-belt, and the alternator is secured to the internal combustion or a support structure thereon by a holding bolt which forms a pivot or fulcrum point and an attachment element and a second positioning bolt permitting swinging of the alternator structure about the holding bolt and thus tightening or tensioning of the V-belt.

BACKGROUND AND PRIOR ART

Alternator structures for assembly with automotive vehicles are well known. The alternator structure referred to is secured to the internal combustion engine in such a manner that the structure can be rotated or pivoted about a holding or support bolt, typically attached to the cylinder block, or a bracket thereon, of the internal combustion engine upon loosening of a suitable holding nut, to permit tightening of the drive belt for the alternator by shifting its position relative to the drive pulley on the internal combustion engine. The alternator is then secured in position by a threaded bolt which is movably positioned on the internal combustion engine or on a bracket thereof which has, for example, an elongated slot for selective positioning of the second bolt. Suitable spacers may be used to ensure proper running alignment of the alternator drive belt with the respective pulleys over which it runs.

Customary structures of alternators of this type use two arms integral with the alternator housing through which the respective support bolt and tensioning bolt can be passed. Different types of automotive engines and automotive engines made by different manufacturers provide for positioning of such an alternator structure at different locations and, consequently, the position of the respective holding bolt and tensioning bolt may also vary from engine to engine, and from manufacturer to manufacturer of the engine. Thus, although the alternator structure itself may be identical for different types of engines, the construction of the alternator housing with the respective attachment arms must be matched to the attachment specifications of the types with which they are to be assembled. This results in excessive manufacturing costs because numerous types of attachment arrangements must be provided for essentially identical alternator structures.

THE INVENTION

It is an object to so construct the alternator that it can be readily adapted to various types of engines and holding arrangements without requiring specific attachment positions matched to a particular engine or, more generally, to provide for modular construction of the alternator in which the final assembly step can be matched to the type of engine required so that the manufacture of the components or parts of the alternator can be standardized and can be suitable for many different types of engines.

Briefly, the alternator has a shell structure with at least one end cover in which a bearing is secured. The shell structure itself has a single attachment projection in form of an elongated bushing extending parallel to the axis of the machine to permit passage of the attachment bolt therethrough for attachment of the alternator to the machine. Rather than having a second bushing for a positioning bolt, however, at least one of the end covers is formed with a radial locating projection formed with an opening in the end portion thereof to permit passage of the clamping or positioning bolt therethrough, the end cover or end shield being positionable with respect to the attachment projection on the housing shell in various angular locations so that the same alternator structure can be used for different attachment arrangements on various types of engines by various manufacturers without departing from the overall structure of the alternator itself.

In accordance with a preferred construction, the cross section of the alternator shell is hexagonal, and the end cover or shield with the locating or clamping projection thereon can be positioned with respect to the attachment projection on the housing shell, at random, in any one of six angularly different positions with respect to the attachment projection.

Separating the function of the two positioning points of the alternator unto the internal combustion (IC) engine on the alternator itself, that is, by locating one of the attachment means on the housing shell and the other on an end shield or end cover, permits placement of the respective attachment or clamping projections as desired, and to match different types of internal combustion engines. Forming the housing with hexagonal cross section has the advantage of simplicity in manufacture, maintenance or repair, and further of simplicity of assembly of the alternator. The most prevalent position of the respective attachment projections, namely 180° apart, can be readily accomodated; other positions can also be easily matched, however, for example by shifting of the end bell with respect to the attachment projection on the housing shell by 60° leading or lagging—with respect to direction of rotation—permits secure and reliable attachment of the alternator to different types of engines. This shift of the end bell can be done in the shield and upon installation, so that a single basic alternator structure can be supplied, for example for replacement of a defective alternator which is essentially universally applicable for assembly with internal combustion engines. Forming the housing with hexagonal cross section has the additional advantage that cooling air ducts for the stator can be inherently formed. The position of electrical connections from the alternator with respect to the attachment projection can likewise be selected to match design specifications of various types of engines by selectively rotating the respective end cover or end shield on which the electrical connections are secured.

Drawings, illustrating a preferred example, wherein.

Figure 1:
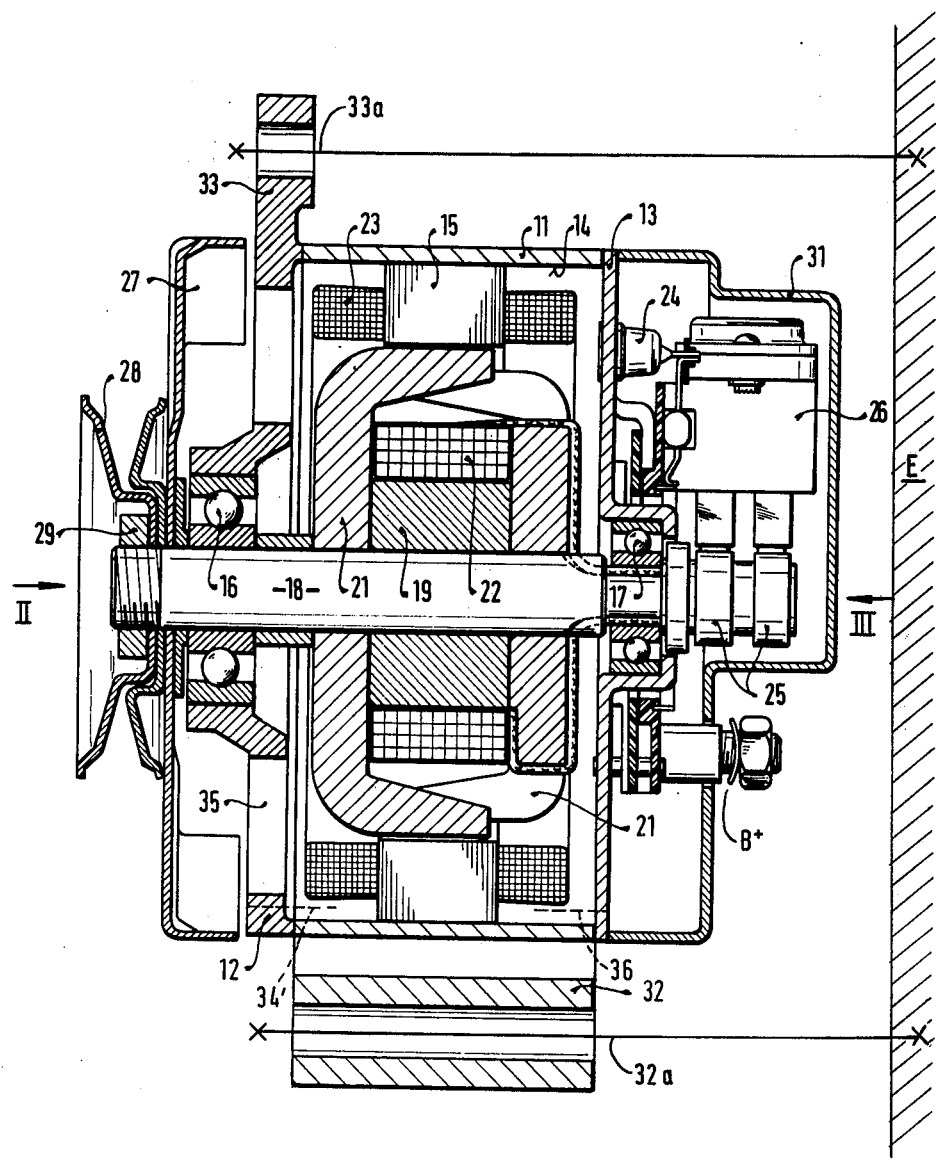
FIG. 1 is a highly schematic cross section through an alternator in accordance with the present invention.

The alternator shown in FIG. 1 is a typical automotive-type alternator for assembly to a support structure, here shown schematically as the engine block E of an internal combustion engine. The alternator is a claw-pole or interdigited type alternator of basically well known construction and will therefore be described only briefly. An outer housing shell 11 is secured to two end shields or end covers 12, 13. The central opening 14 of the housing shell 11 retains a stator 15, for example by a press fit or interference fit. The end shields 12, 13 retain bearings 16, 17 in which the machine shaft 18 is journalled. The rotor has a core 19, pole shoes or claw poles 21 and a field winding 22. The stator 15 has a stator magnetic stack structure and stator windings 23 which are electrically connected to rectifiers 24, in accordance with well known rectifier circuits. The terminals of the field windings 22 are connected to slip rings 25 which, in turn, are connected to an assembly which includes current supply brushes and the voltage regulator 26.

The drive side of the machine, that is, the left side with respect to FIG. 1, includes a fan or ventilating wheel 27 and a drive pulley 28, both secured to the shaft 18 by a nut 29. The two end covers or end shields 12, 13 are secured to shell 11 with screws. A cover 31 is attached to the end shield 13 to protect the electrical components 24, 25, 26.

An attachment projection 32 is formed integral with the housing shell 11. The end cover or end shield 12 at the drive side of the machine has a locating projection 33 formed integrally therewith. Bolts 32a and 33a, shown schematically only, connect the respective attachment projections 32, 33 to the support structure E. Suitable spacers, as well known, space the right end faces of the respective projections 32, 33 from the support structure E. A detailed showing of the bolts and of the spacers has been omitted since this is a standard automotive construction.

Figure 2:
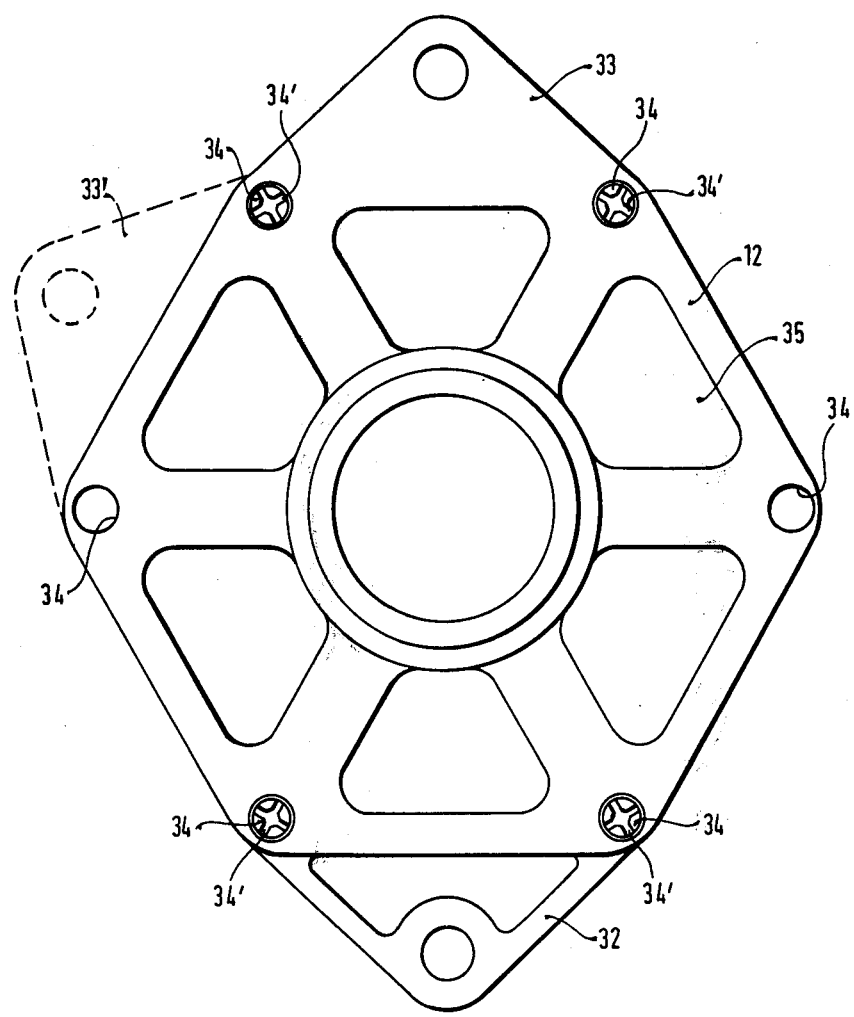
FIG. 2 is an end view taken from the left or drive side of the machine, with the drive pulley and fan omitted, and taken in the direction of the arrow II.

FIG. 2 shows the end view taken in the direction of the arrow II (FIG. 1) of the alternator, without a rotor, and after removal of the drive pulley 28, the fan blade 27, and nut 29. The end cover 12 is formed with a central opening for bearing 16 to journal the machine shaft 18. The positioning or locating projection or arm 33 is integral with the end shield 12 and, as shown in FIG. 2, the arm 33 is positioned upwardly vertically. The projection 32 formed on the housing shell 11 is visible at the lower central position. The shell 11 itself has been omitted from FIG. 2 for clarity and is not visible, being covered by the edge portions of the end shield 12. The cross section of the shell 11, behind the shield 12, is radially symmetrically hexagonal and, consequently, the end shields 12, 13 have a hexagonal end view, with the additional arm 33 integral with the shield 12. The fixed corners of the end shields 12, 13 have screw openings 34 formed therein. It is usually sufficient to secure the end shields 12, 13 to the shell 11 by three to four screws 34' only. The shell 11 and the respective end shields 12, 13 may have, of course, a cross section as desired, for example square, pentagonal, or otherwise polygonal, or also circular; a hexagonal cross section, however, is preferred for ease of matching the alternator to various types of engines and engine support structures E.

As seen in FIGS. 1 and 2, the end shield 12 is so secured to the shell 11 and its holding arm or projection 32 that the locating or positioning arm 33 of the end shield 12 is 180° offset with respect to the arm 32. The end shield 12 can, however, be re-positioned in 60° steps, for example re-positioned such that the arm 33 will fall into the position indicated by the broken lines 33'. The openings 35 within the shield 12 provide for ventilation of air flowing axially through the alternator.

Figure 3:
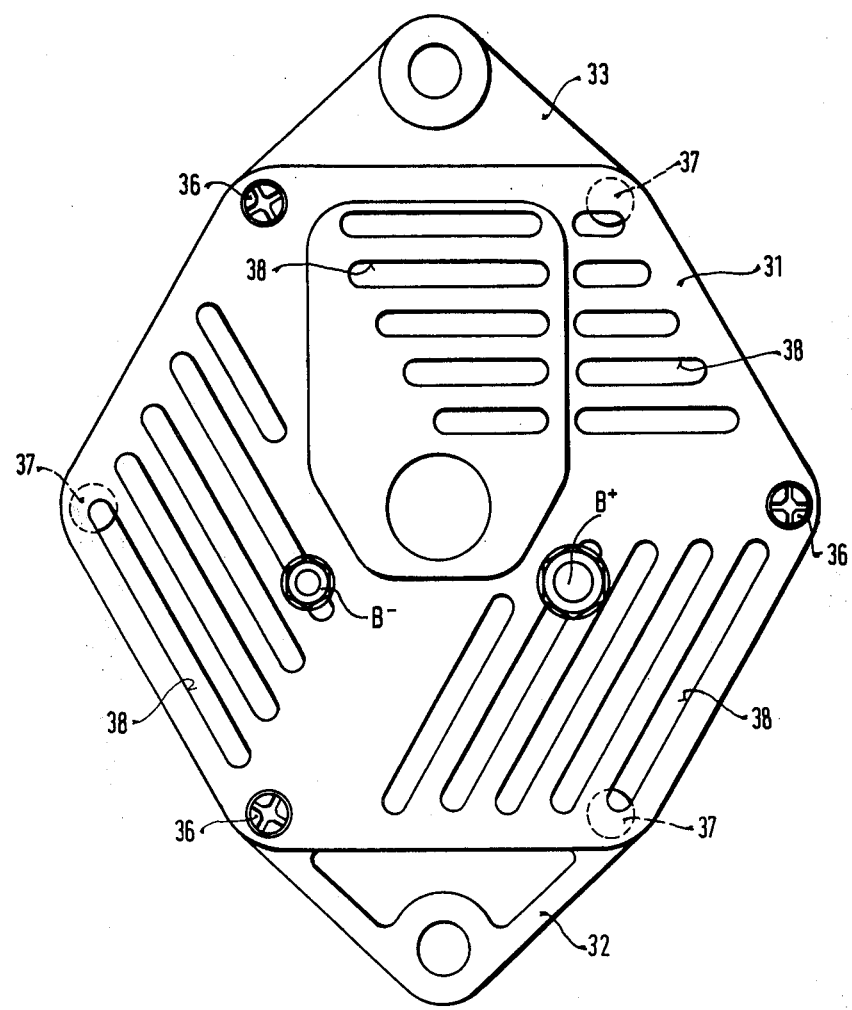
FIG. 3 is an end view taken in the direction of the arrow III of FIG. 1 and illustrating the machine from the rectifier side thereof.

FIG. 3 illustrates the machine from the right side, arrow III of FIG. 1. The cover 31 is secured by three screws 36 to the end shield 13. Screws 36 attach the end shield 13 to respective corners of the shell 11. Three further screw holes 37, covered by the shield 13, can be used for selective positioning of the shield 13 on the alternator, so that the location of the electrical output terminals B+, B−, with respect to the arms 32, 33 on the shell 11 and the drive end shield 12, can be located as desired. The cover 13 is formed with ventilating openings 38 so that air can be sucked by the fan blade 27 axially through the alternator.

Various changes and modifications may be made within the scope of the inventive concept; at least one of the end shields or covers 12, 13 can be constructed as described in the cross-referenced applications.

Making housing shell 11 and the end covers 12, 13 in polygonal, and particularly hexagonal outline has the additional advantage that torque forces applied on the housing upon tightening a drive belt running over pulley 28 can be accepted by the housing structure, and not only by frictional engagement of the end covers with the shell.

We claim:

1. Alternator structure for assembly with a mobile internal combustion engine (E) particularly for automotive use having
    a housing (11);
    a stator (15, 23) located and secured in the housing;
    a rotor (19, 21) having a shaft (18) journaled in bearings (16, 17) positioned and secured in the housing;
    and attachment means (32, 33) to removably and adjustably attach the structure to the internal combustion engine,
    wherein, in accordance with the invention,
    the machine housing comprises a polygonal radially symmetrical tubular shell structure (11) and at least one end cover (12) of polygonal radially symmetrical plan outline matching the polygonal tubular housing shell structure in which at least one respective bearing (16) is secured;
    the tubular shell structure includes an outwardly extending attachment projection or arm (32) in form of an elongated bushing extending parallel to the axis of the machine, to permit passage of an attachment bolt (32a) therethrough for attachment to the internal combustion engine (E);
    the at least one end cover (12) includes a radial locating projection (33) formed with an opening in the end portion thereof to permit passage of a locating or positioning clamping bolt (33a) therethrough for attachment to the internal combustion engine (E) to fix the position of the alternator structure with respect to the internal combustion engine;
    and attachment means (34, 34') removably and selectively angularly positionable to attach said at least one end cover (12) in predetermined selected angular orientation to the shell structure (11).

2. Structure according to claim 1, wherein the at least one end cover (12) is formed with a plurality of screw openings, radially symmetrically positioned thereon adjacent the corners of the polygonal outline thereof;

and the shell (11) is formed with matching means adjacent the corners of the polygon formed thereby receiving screws passed through said openings and radially symmetrically positioned thereon at predetermined locations with respect to said attachment projection or arm (32).

3. Structure according to claim 1, wherein the stator (15, 23) is secured within the shell (11) by an interference or press fit.

4. Structure according to claim 1, wherein the attachment means comprise openings formed at the corners of the polygon defined by the shell and the at least one end cover.

5. Structure according to claim 1 or 2 or 3 or 4, wherein the polygon is a hexagon.

6. Structure according to claim 1, wherein the machine has two end covers (12, 13), and the attachment means in said end covers are in axial alignment.

7. Structure according to claim 5, wherein the machine has two end covers, and both end covers have essentially hexagonal outline, at least one of said end covers being formed with said radial locating projection (33), and both said end covers being formed with said attachment means positioned adjacent the corners of the hexagonal outline for random positioning of said end covers with respect to the attachment projection or attachment arm (32) of the housing shell structure.

8. Structure according to claim 5, wherein the attachment projection or arm (32) of the shell is integral therewith.

9. Structure according to claim 8, wherein the radial locating projection or arm (33) on the at least one end cover (12) is integral therewith, and said attachment means are releasable for selective radial positioning of the attachment arm (32) and the locating arm (33) with respect to each other.

* * * * *